Oct. 22, 1935. S. F. DAVENPORT 2,018,622
METHOD OF FORMING WINGS FOR FISH LURES
Original Filed July 6, 1932
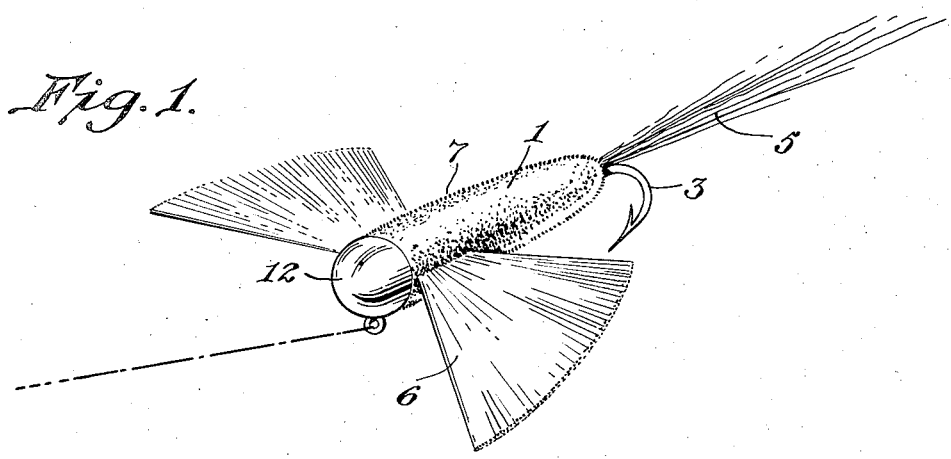
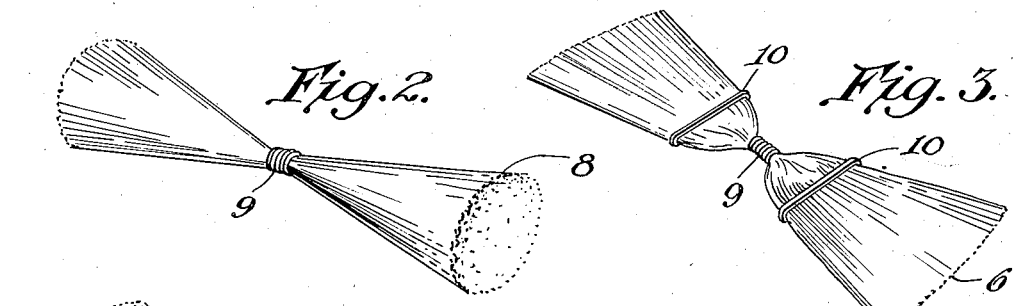
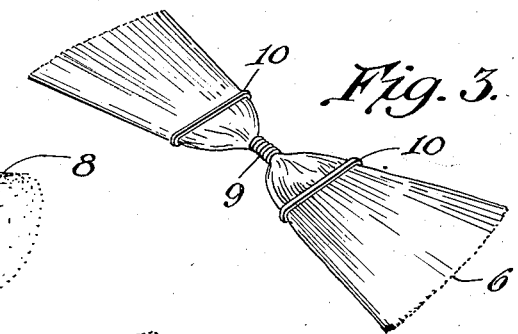
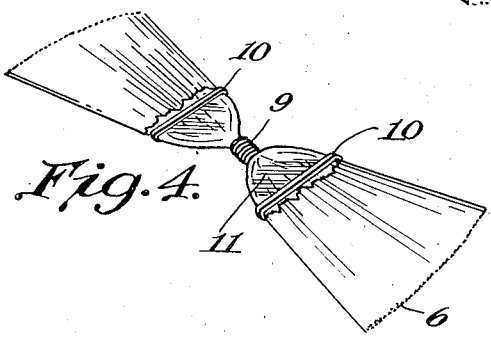
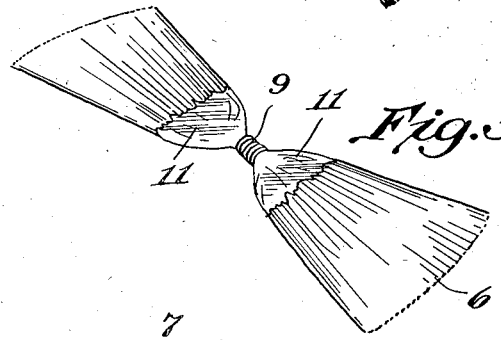
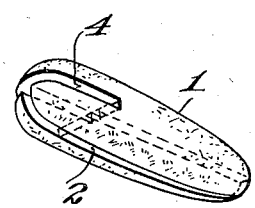
Inventor
S. F. Davenport
By Eccleston & Eccleston,
Attorneys Patented Oct. 22, 1935

2,018,622

UNITED STATES PATENT OFFICE 2,018,622

METHOD OF FORMING WINGS FOR FISH LURES

Sam F. Davenport, Garrett, Ind., assignor to Creek Chub Bait Company, Garrett, Ind.

Original application July 6, 1932, Serial No. 621,105. Divided and this application September 29, 1934, Serial No. 746,229

3 Claims. (Cl. 43—48)

This invention relates to the manufacture of wings in simulation of the wings of small bugs, for use in the preparation of artificial fish baits, and has for its primary object to provide a simple and inexpensive process for producing such wings in large quantities.

Another object of the invention resides in the provision of a process for producing wings from bundles of hairs, in which process only a few steps are required in forming the final product.

A further object of the invention resides in a simple process for producing wings of hair in which the tufts of hair are permanently held in flat condition.

Other objects and advantages of the invention will be apparent from the following description when taken in connection with the accompanying drawing, in which, Figure 1 is a perspective view of the complete lure.

Figures 2, 3, 4 and 5 are perspective views of the wings showing the successive stages of construction.

Figure 6 is a perspective view of the lure body showing the slot in which the wings are mounted, and Figure 7 is a transverse sectional view through the completed lure.

The lure of the present invention is a very close representation of a winged insect, and one of the essential features of the invention relates to the production of thin, flexible, flat wings of hair as distinguished from the relatively thick and clumsy constructions of the prior art.

Referring to the drawing in detail, the numeral 1 indicates the lure body which is preferably formed of cork or other buoyant material and provided with a longitudinal slot 2 by means of which a fish hook 3 is mounted. A horizontal transverse slot 4 is also formed in the front end of the lure for the reception of the flat, hair wings as will appear hereinafter.

A tail 5 consisting of a bundle of hairs, is mounted in the slot 2 above the hook 3 and projects rearwardly as indicated. The wings 6 are then mounted in the transverse slot 4 and the body is ready to receive the finish.

The body of the lure is treated to present the appearance and texture of the body of an insect as indicated by the numeral 7, and is described in detail in my application, Ser. No. 621,105, for fly rod lure, filed on July 6, 1932, of which the present application is a division.

The wings 6 of the simulated insect are formed of hairs 8 which are first tied into a bundle. A thread of silk or the like 9 is used for this purpose and is wrapped tightly about the middle of the bundle of hairs causing them to flare outwardly in the form of tufts as indicated in Figure 2. The bundles or double tufts of hair are then placed in ordinary stapling machines so as to flatten out the tufts into the shape of wings. The pressure of the hammer and anvil of these machines spreads the hairs out flat into a thin sheet as shown in Figure 3, and the staples 10 are then applied.

The next step in the process of forming the permanently flat wings consists in applying a drop of lacquer or other cement 11 to the partly formed wings at each side of the binding 9 between the staples 10. This material permeates the bundle of hairs adjacent the binding, and when dried serves to firmly hold the hairs in their flattened sheet-like form. The staples 10 are then removed and the wings are completed and in the form shown in Figure 5. The completed wings are assembled with the body 1 by inserting them in the transverse slot 4 provided for that purpose.

The lure is completed by the addition of a celluloid cap 12, the mounting of which is fully described in my copending application heretofore referred to.

From the foregoing description and the attached drawing, it will be apparent to those skilled in the art that I have devised an exceedingly simple and inexpensive process for producing thin, flat wings of hair; that the process is susceptible to the quantity production of the wings described; and that the wings as produced by the process are comparatively strong and durable, and are capable of permanently retaining their initial shape.

In accordance with the patent statutes, I have described what I now believe to be the preferred steps in the process, but since various minor changes may be made in the process without departing from the spirit of the invention, it is intended that all such changes be included within the scope of the appended claims.

What I claim is:

1. The method of preparing hair wings for artificial lures which comprises securing a bundle of hairs intermediate their ends to provide tufts, flattening out the tufts of hairs at each side of the securing means, and applying a lacquer or the like to said tufts to maintain them in their flattened condition.

2. The method of preparing hair wings for artificial lures which comprises tying a bundle of hairs intermediate their ends to provide tufts, and flattening out the tufts of hairs at each side of the tying means by applying staples thereto.

3. The method of preparing hair wings for artificial lures which comprises tying a bundle of hairs intermediate their ends to provide tufts, flattening out the tufts of hairs at each side of the tying means by applying staples thereto, applying adhesive to the flattened tufts and thereafter removing the staples.

SAM F. DAVENPORT.